(12) United States Patent
Mishra et al.

(10) Patent No.: US 10,727,963 B1
(45) Date of Patent: Jul. 28, 2020

(54) TECHNIQUES FOR SYNCHRONIZING CONTENT

(71) Applicant: Amazon Technologies, Inc., Seattle, WA (US)

(72) Inventors: Priyank Mishra, San Bruno, CA (US); Hisham Baz, San Francisco, CA (US); Sirish Subramanian, Oakland, CA (US); Alberto Cerati, Seattle, WA (US); Shannph Simon Wong, Foster City, CA (US); Mohan Kishore, Foster City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 149 days.

(21) Appl. No.: 15/875,786

(22) Filed: Jan. 19, 2018

(51) Int. Cl.
*H04N 21/43* (2011.01)
*H04H 20/18* (2008.01)
*H04J 3/06* (2006.01)
*H04H 20/33* (2008.01)

(52) U.S. Cl.
CPC ............ *H04H 20/18* (2013.01); *H04H 20/33* (2013.01); *H04J 3/0664* (2013.01)

(58) Field of Classification Search
None
See application file for complete search history.

(56) References Cited

U.S. PATENT DOCUMENTS

| 6,263,505 B1 * | 7/2001 | Walker | H04N 7/17318 |
| | | | 348/E7.071 |
| 2009/0013086 A1 * | 1/2009 | Greenbaum | H04L 12/1822 |
| | | | 709/231 |
| 2014/0123014 A1 * | 5/2014 | Keen | H04L 51/046 |
| | | | 715/719 |

* cited by examiner

*Primary Examiner* — Ayanah S George
(74) *Attorney, Agent, or Firm* — Kilpatrick Townsend & Stockton LLP

(57) ABSTRACT

Systems and methods are provided herein for synchronizing content. In at least one embodiment audio content related to a live event is played utilizing an audio output device of a computing device. Supplemental data related to the live event is received. The supplemental data may be associated with a timestamp corresponding to a particular time during the live event to which the supplemental data relates. A current play time of the audio content may be determined. The supplemental data may be stored based at least in part on a comparison of the timestamp and the current play time. The supplemental data may be presented when the timestamp corresponds to the current play time of the audio content being played.

20 Claims, 9 Drawing Sheets

TECHNIQUES FOR SYNCHRONIZING CONTENT

BACKGROUND

A stream of data is a continuous transmission of time-stamped events that can be collected, processed, and/or presented. Streaming is a technology used most often to deliver live or real-time content to computers and mobile devices over the Internet. A computing device (e.g., a server) transmits data (e.g., audio and/or video data) as a continuous flow, which allows recipients to begin watching and/or listening almost immediately without requiring the content to be entirely downloaded onto a client device first. By way of example, a client device (e.g., a laptop, mobile phone, desktop computer, etc.) can be used to play an audio stream that allows a user to listen to an event happening in real time (e.g., a sporting event, a musical concert, etc.).

As clients are streaming such content, it is possible that the media stream may be delayed due to various factors (e.g., the processing capabilities of the client device, transmission speeds of the client's Internet connection, general Internet transmission delays, buffering times, distance, etc.). Thus, there is often a delay between when an event happens live and when the event occurs in the media stream being played on the client's device. This delay can vary between client devices that may each be playing the same media stream.

BRIEF DESCRIPTION OF THE DRAWINGS

Various embodiments in accordance with the present disclosure will be described with reference to the drawings, in which.

DETAILED DESCRIPTION

Figure 1:
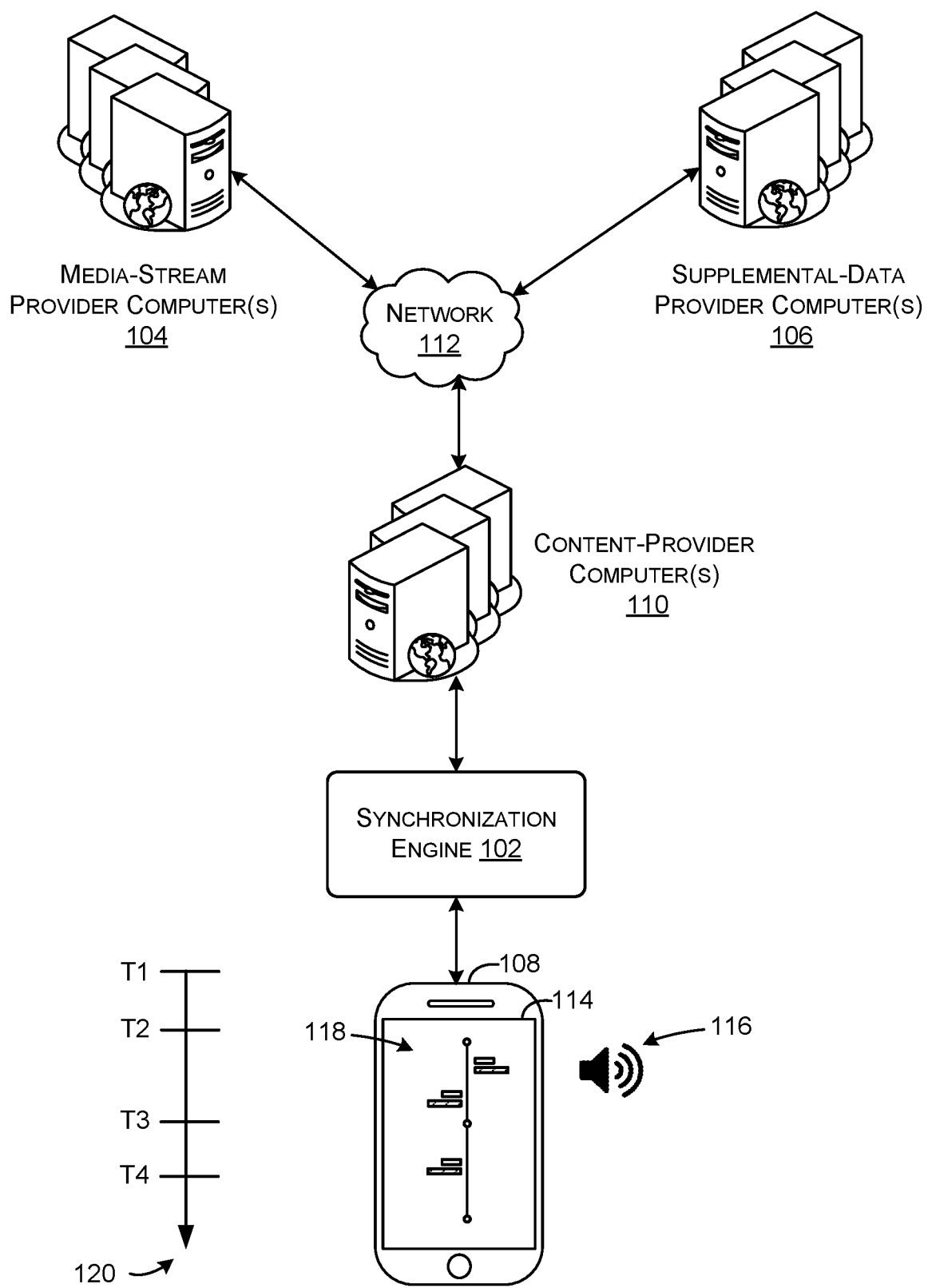
FIG. 1 is a schematic diagram illustrating an example environment suitable for implementing aspects of a synchronization engine, in accordance with at least one embodiment.

Techniques described herein are directed to a synchronization engine for synchronizing content. "Content" may include a media stream and/or supplemental data related to the media stream. A "media stream" may utilize streaming technology that enables a client device to present audio and/or video media content, or any suitable data, related to a live event (e.g., a television show, a sporting event, a concert, a political debate, or any suitable event happening live, or in other words, at substantially the same time as the media stream is being played). "Supplemental data" may include metadata in any suitable format that corresponds to the same event to which the media stream pertains, and may also utilize streaming technology that enables the client device to present the supplemental data in real time. Although examples herein may utilize a sporting event for illustrative purposes, it should be appreciated that the techniques discussed herein are equally applicable to any suitable events for which a media stream and supplemental data are available.

As a non-limiting example, a user, operating a client device such as a mobile phone, may access a media stream via an application operating on the client device (e.g., a browsing application, an application that provides access to media streams and/or supplemental data, etc.). By way of example, the client device may utilize an application that provides access to media streams for listening to audio broadcasts of various sporting events (e.g., soccer matches). Utilizing the application interface, the user may make a selection of a particular soccer match. This selection may cause a synchronization engine (e.g., a component of the application or a standalone engine) to begin receiving a media stream corresponding to an audio broadcast of the soccer match. The synchronization engine may provide the media stream on the speakers of the client device. The synchronization engine may further be configured to receive supplemental data related to the soccer match. This supplemental data may be provided from the same or different source as the media stream source. In some examples, the media stream and the supplemental data may originate from different third-party content providers. The application may provide one or more interfaces for displaying the supplemental data. For example, an interface may be provided that displays a timeline of the sporting event that indicates particular events (e.g., player substitutions, fouls, penalties, goals, match time adjustments, or the like) occurring during the soccer match.

Continuing with the example above, as the media stream of the soccer match is played, the synchronization engine may receive supplemental data (e.g., via a push notification or by any suitable means), determine a time within the live event to which the supplemental data relates, and cause the supplemental data to be presented (e.g., displayed) together with the audio being played from the media stream. Utilizing the synchronization engine in this manner ensures that the supplemental data is presented at substantially the same time as the event is heard by the user. If supplemental data is received that corresponds to an event that has not yet occurred in the media stream being played, the synchronization engine may cause the supplemental data to be stored/buffered (e.g., on the client device) until such time as the event occurs in the media stream. When the event occurs in the media stream, the synchronization engine may cause the stored supplemental data to be presented to the user such that the event occurring within the media stream and the supplemental data are synchronized. Thus, the synchronization engine may be utilized to avoid situations in which the media stream and supplemental data corresponding to the same event provide conflicting information. For example, if the supplemental data (e.g., identification of a goal scored)

were to be presented prior to the streaming data that corresponds to that event (e.g., the announcer stating that the goal was scored).

In some situations, the user may not be actively playing an media stream (e.g., an audio and/or video media stream) of an event. For example, the user may not have selected a media stream to play, or playback of a selected media stream may be delayed due to a slow Internet connection. Nevertheless, supplemental data of an event may be received by the synchronization engine. In this scenario, the supplemental data may be provided (e.g., upon receipt or at any suitable time) via any suitable number of interfaces of the application, or any suitable means for providing information to the user via the client device (e.g., a notification provided in the lock screen and/or home screen of the client device). If the media stream corresponding to the event begins to play on the user device, new supplemental data received may be stored until such time as the media stream catches up to the event(s) associated with the supplemental data. When playback of the media stream matches the time in the event to which the newly received supplemental data relates, the supplemental data may be presented via any suitable interface of the application.

An instance of the synchronization engine discussed herein may operate on each of a number of client devices. Each client device may experience delay in playback of the media stream. For example, playback of the audio stream on a client device having a slower Internet connection may lag behind the live event more so than a playback occurring on a client device having a relatively faster Internet connection. The respective synchronization engines operating on each device may individually ensure that the supplemental data received is presented according to the current play time within the respective media streams being played.

Utilizing the techniques discussed herein, the synchronization engine described herein may synchronize content (e.g., a media stream and supplemental data) in a manner that is particular to the device on which it operates. By synchronizing content, situations in which conflicting information is presented utilizing a media stream and supplemental data are at least reduced, if not entirely avoided.

FIG. 1 is a schematic diagram illustrating an example environment 100 suitable for implementing aspects of a synchronization engine 102, in accordance with at least one embodiment. The environment 100 may include media-stream provider computer(s) 104 and/or supplemental-data provider computer(s) 106, a client device 108, and/or content provider computer(s) 110. The media-stream provider computer(s) 104, the supplemental-data provider computer(s) 106, the client device 108, and the content provider computer(s) 110 may be communicatively connected via network 112 (e.g., the Internet). In some examples, the media-stream provider computer(s) 104 and the supplemental-data provider computer(s) 106 may be operated by, or on behalf of a same entity or different entities. Similarly, the content provider computer(s) 110 may be operated by, or on behalf of, the same or different entity/entities as the media-stream provider computer(s) 104 and/or the supplemental-data provider computer(s) 106.

The media-stream provider computer(s) 104 may be configured to provide a media stream corresponding to a live event (e.g., a soccer match). The supplemental-data provider computer(s) 106 may be configured to provide supplemental data corresponding to the same live event. The media stream and/or the supplemental data may be received by the content provider computer(s) 110. The content provider computer(s) 110 may be configured to transmit the media stream and/or the supplemental data to the synchronization engine 102. If received by the content provider computer(s) 110, the media stream and/or supplemental data may be altered in any suitable manner. By way of example, supplemental data received by the content provider computer(s) 110 may be received and reformatted or otherwise included in a push notification or other suitable message. The content provider computer(s) 110 may be configured to transmit the push notification/message including at least some portion of the supplemental data to the synchronization engine 102 for processing. The media stream and/or the supplemental data may additionally or alternatively be transmitted from the media-stream provider computer(s) 104 and/or the supplemental-data provider computer(s) 106 directly to the synchronization engine 102 via the network 112. In some examples, the synchronization engine 102 may operate on a client device 108 as part of an application operating on the client device 108 or as a standalone software and/or hardware module of the client device 108.

In some examples, the media-stream provider computer(s) 104 and/or the content provider computer(s) 110 may provide event data (e.g., an event identifier, a topic name, a start time, one or more team names, venue information (e.g., a stadium name), or any suitable information corresponding to one or more events) at any suitable time to the client device 108. The synchronization engine 102 may receive and store the event data in local memory of the client device 108. In some examples, the synchronization engine 102 may request the event data from the media-stream provider computer(s) 104 and/or the content provider computer(s) 110 at any suitable time. Event data may be updated at any suitable time by the media-stream provider computer(s) 104 and/or the content provider computer(s) 110. By way of example, if the soccer match begins later than the scheduled start time, the media-stream provider computer(s) 104 and/or the content provider computer(s) 110 may update the event data for the soccer match to reflect the actual start time.

In at least one embodiment, a user may operate the client device 108 to access an option for playing a media stream (e.g., an audio stream of a soccer match). Upon selecting the option, or at another suitable time, the synchronization engine 102 may be configured to determine a topic name associated with the media stream from event data. By way of example only, the synchronization engine 102 may determine from data received and/or obtained from the media-stream provider computer(s) 104 and/or the content provider computer(s) 110 (e.g., a schedule of events) that the topic name associated with the selected event is "German Soccer Match XYZ."

If the soccer match has already commenced, or upon commencement of the soccer match, the media-stream provider computer(s) 104 may transmit the media stream. In this case, the synchronization engine 102 may begin receiving the media stream from the media-stream provider computer(s) 104 and/or the content provider computer(s) 110. The media stream may be in any suitable format.

At any suitable time after commencement of the soccer match, the supplemental-data provider computer(s) 106 may provide supplemental data related to the soccer match. For example, supplemental data may include information provided from sensor devices such as goal-line detectors that determine when an object has passed a boundary marked by a goal line on a field. Supplemental data may additionally or alternatively include event metadata. For example, commentary of the event may be provided via text and included in the supplemental data, information related to player substitutions, fouls, penalties, and the like may be included in the supplemental data. One or more instances of supplemental data may be provided during the event (e.g., the soccer match). Each instance may be timestamped with a time during the live event to which the supplemental data relates. For example, if a soccer match starts at 1:00:00 PM, and a player is substituted at 1:10:35, the supplemental data transmitted related to the substitution may be timestamped (e.g., with 1:10:35, and/or an offset value indicating that the event occurred 10 minutes and 35 seconds into the event, and/or any other suitable form of time measurement). The supplemental data may further indicate an event identifier and/or topic name to which the supplemental data relates.

The synchronization engine 102 may receive the media stream (e.g., from the media-stream provider computer(s) 104 and/or the content provider computer(s) 110) via the network 112. The synchronization engine 102 may cause the media stream to be provided via a display 114 of the client device 108 and/or a speaker of the client device 108 (as indicated at 116). If the media stream is displayed, the media stream may be displayed via an interface provided by the synchronization engine 102 and/or an application operating on the client device 108.

At any suitable time, the synchronization engine 102 may receive the supplemental data related to the event (e.g., from the supplemental-data provider computer(s) 106 and/or the content provider computer(s) 110) via the network 112. The synchronization engine 102 may determine that the media stream of the event is already being played on the client device 108. If so, the synchronization engine 102 may determine a current play time of the media stream. Continuing with the example above, the media stream may be the equivalent of nine minutes and 55 seconds into the event. The synchronization engine 102 may add the nine minutes and 55 seconds corresponding to the current play duration to the start time of the event (e.g., 1:00:00 PM) to determine a current play time of 1:09:55 PM. The synchronization engine 102 may determine a time during the event to which the received supplemental data relates. For example, the synchronization engine 102 may determine, utilizing the timestamp received in the supplemental data, that the supplemental data corresponds to an event (e.g., a player substitution) occurring at 1:10:35 PM. Upon determining that the timestamp of the supplemental data indicates a time (e.g., 1:10:35 PM) that occurs after the current play time of the media stream (e.g., 1:09:55 PM), the synchronization engine 102 may buffer and/or store the supplemental data in any suitable storage of the client device 108. The synchronization engine 102 may initiate a timer to wait 40 seconds before displaying the supplemental data such that the supplemental data is provided on the display 114 of the client device 108 at relatively the same time as the event is occurring in the media stream.

Alternatively, the synchronization engine 102 may access storage at a periodic rate (e.g., every second, every two seconds, or any suitable timing frequency) to determine if stored supplemental data exists corresponding to the event (e.g., as indicated by the event identifier and/or topic name included in the supplemental data) with a timestamp that indicates a time that is equal to the current play time or that occurs prior to the current play time of the media stream. If supplemental data exists with a timestamp that is equal to the current play time or that indicates a time prior to the current play time, the synchronization engine 102 may cause at least a portion of the supplemental data to be provided with the media stream on the display 114 and/or a speaker of the client device 108. The synchronization engine 102 may continue to check for supplemental data any suitable number of times, at any suitable rate, while the media stream is played.

In may be the case that the media stream is not currently being played when supplemental data associated with the event is received. In this scenario, the synchronization engine 102 may present the received supplemental data upon receipt or at any suitable time on the display 114 and/or a speaker of the client device 108. If the media stream is subsequently played, the synchronization engine 102 may continue to present (e.g., display) supplemental data that has already been presented, but begin storing newly-received supplemental data in the manner discussed above until such time as the current play time of the media stream is equal to or greater than the timestamp of the newly-received supplemental data.

As a specific example, the media-stream provider computer(s) 104 and/or the content provider computer(s) 110 may broadcast event data at T1 (e.g., 1:00:00 PM). The event data may indicate that a particular soccer match (e.g., as indicated by an event identifier and/or topic name) is starting at 1:00:00 PM. The event data may be received by the synchronization engine 102 and stored on the client device 108. At T2, the synchronization engine 102 may receive a portion of the media stream from media-stream provider computer(s) 104 and/or the content provider computer(s) 110. At T2, the synchronization engine 102 may cause the received portion of the media stream to be presented on the client device 108 (e.g., via a speaker as depicted at 116). As a non-limiting example, T2 may occur ten seconds after T1 (the start time of the soccer match). Thus, the media stream may lag ten seconds behind the live event. At T3, the synchronization engine 102 may receive supplemental data corresponding to five minutes from the start time of the event (e.g., 1:05:00 PM). The synchronization engine 102 may determine that the media stream has a current play time of four minutes and 42 seconds into the event. Accordingly, the synchronization engine 102 may store the supplemental data received at T3 in storage of the client device 108. At T4, either by periodically checking the storage, or upon expiration of a timer or other suitable scheduling mechanism, the synchronization engine 102 may determine that the current play time of the media stream is five minutes into the event. Based on this determination, the synchronization engine 102 may cause the supplemental data to be presented (e.g., via the display 114) on the client device 108 at substantially the same time as the event is transpiring within the media stream. Thus, the interface 118 may be updated to indicate event data (e.g., an indication of a goal, a player substitution, etc.) as the event is being presented on the speaker of the device.

Figure 2:
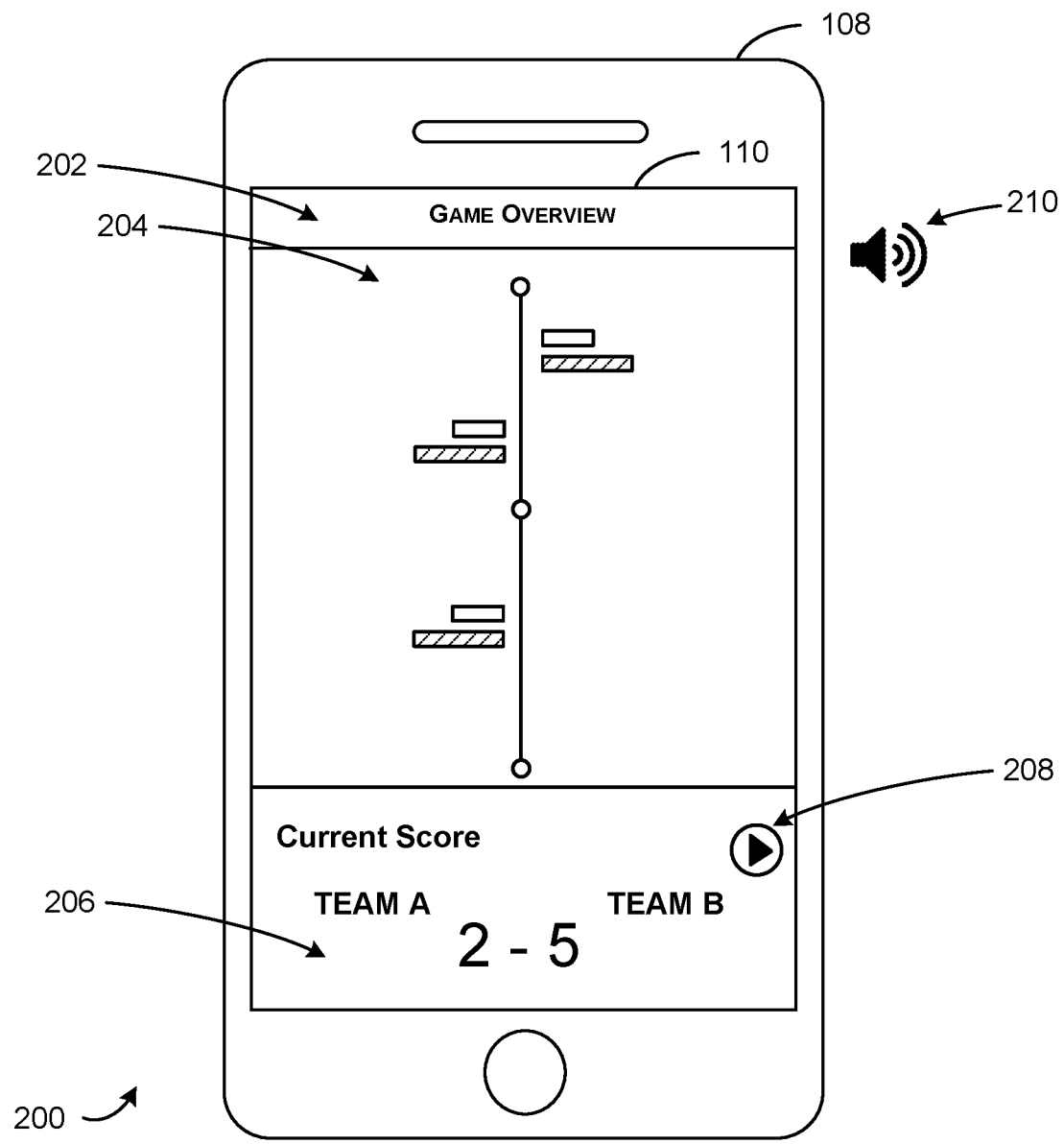
FIG. 2 is a schematic diagram illustrating an example user interface for presenting synchronized content, in accordance with at least one embodiment.

FIG. 2 is a schematic diagram illustrating an example user interface 200 for presenting synchronized content, in accordance with at least one embodiment. User interface 200 may be provided by the synchronization engine 102 (or another suitable application operating on the client device 108). The user interface 200 may include any suitable number of areas such as a title area 202, a timeline area 204, and/or a current score area 206. The user interface 200 may include any suitable number of graphical elements such as play button 208. Upon user selection of the play button 208, the synchronization engine 102 may be configured to receive an indication of the selection and cause a media stream (e.g., an audio stream) associated with the play button 208 to be played on a speaker of the client device 106 as indicated at 210.

In some embodiments, the synchronization engine 102 may receive supplemental data corresponding to a live event associated with the user interface 200. By way of example, the user interface 200 may be a game overview of a particular sporting event being streamed live. The supplemental data received may correspond to the same sporting event. Upon receipt of the supplemental, or at another suitable time, the synchronization engine 102 may determine that media stream is not currently being played. As a result, the synchronization engine 102 may cause any suitable portion of the user interface 200 (e.g., the timeline area 204, the current score area 206, etc.) to be updated with the supplemental data. By way of example, the supplemental data may indicate that a player substitution has occurred. The supplemental data may include a first player's name to be removed from the field, a second player's name who will be added to the field, and a timestamp corresponding to a time within the live event at which the substitution occurred. The synchronization engine 102, based at least in part on a determination that the corresponding media stream of the live event is not currently being played, may update the timeline area 204 with text or graphical images indicating that the substitution has occurred.

In at least one embodiment, the synchronization engine 102 may determine that received supplemental data corresponds to a media stream that is currently being played on a speaker of the client device 106 as depicted at 210. This determination may include comparing an event identifier and/or topic name of the supplemental data to an event identifier and/or topic name associated with the media stream. If the event identifier/topic names match, the synchronization engine 102 may determine that the supplemental data relates to the media stream. The synchronization engine 102 may then compare the timestamp of the supplemental data to a current play time of the media stream. The current play time may indicate a particular time within the live event that is currently being played. When the received supplemental data has a timestamp that indicates it corresponds to a time in the live event that has already been presented via the media stream, the synchronization engine 102 may update any suitable area of the user interface 200 immediately. If, however, the synchronization engine 102 determines that the supplemental data has a timestamp that indicates that a time in the live event that has not yet been presented via the media stream, the synchronization engine 102 may buffer (or otherwise store) the supplemental data in memory on the client device 108. When the media stream eventually reaches a time that occurs after the timestamp of the supplemental data, the synchronization engine 102 may utilize the supplemental data to update any suitable portion of the user interface 200.

By way of example only, the supplemental data may indicate a goal has been made. Presenting the supplemental data may include updating the timeline area 204 to include information indicating that the goal has been made. In some cases, the information may include a name of the player who was responsible for making the goal. Additionally, or alternatively, the current score area 206 may be updated with an updated score. The updated score may be included in the supplemental data received, or the updated score may be calculated based on the supplemental data received.

Figure 3:
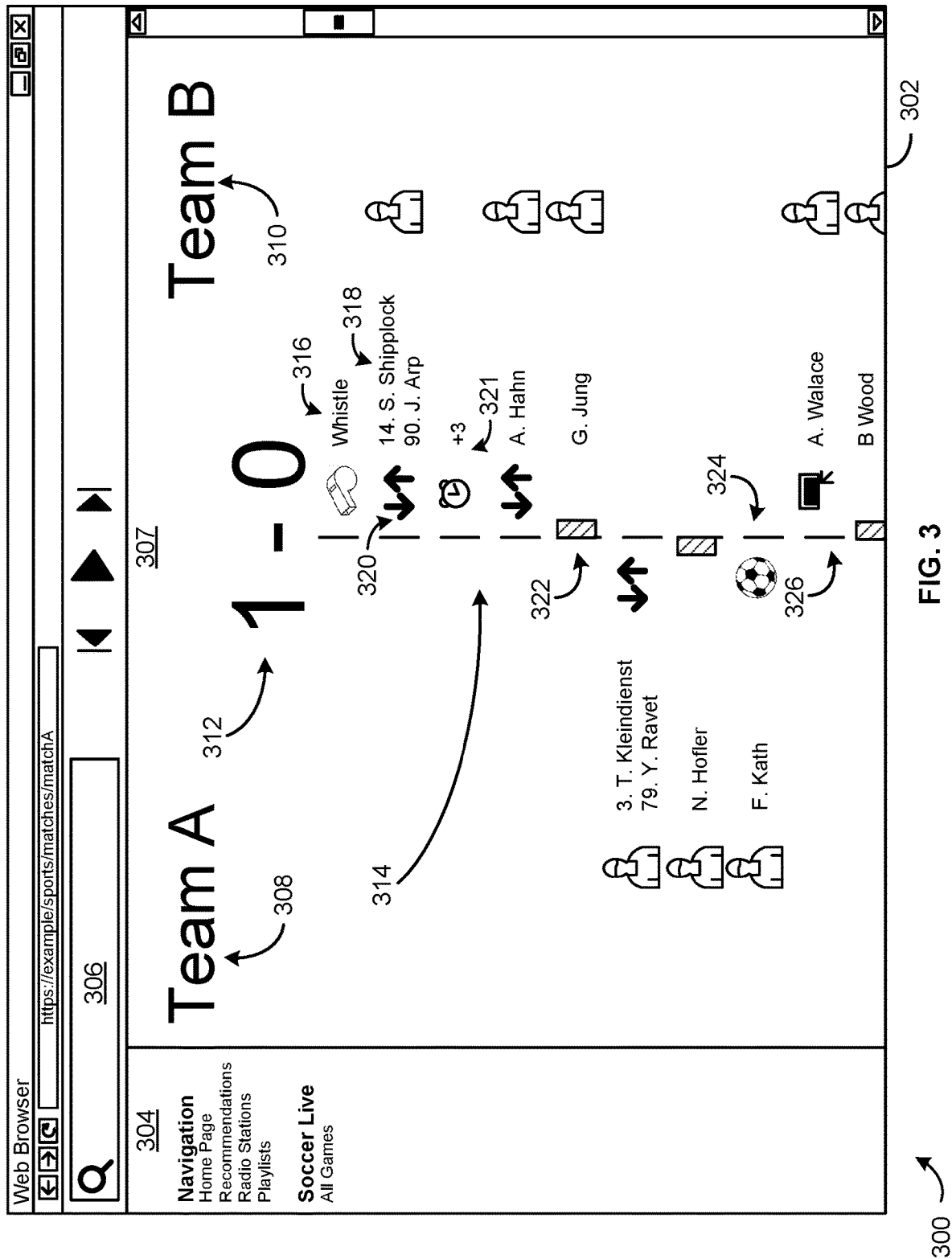
FIG. 3 is a schematic diagram illustrating another example user interface for presenting synchronized content, in accordance with at least one embodiment.

FIG. 3 is a schematic diagram illustrating another example user interface 300 for presenting synchronized content, in accordance with at least one embodiment. User interface 300 may be provided by the synchronization engine 102 (or another suitable application operating on the client device 108 of FIG. 1). In at least one example, the user interface 300 may be presented via a network page 302. The user interface 300 may include any suitable number of areas such as a navigation area 304, a search area 306, a game overview area 307. The game overview area 307 may indicate any suitable information associated with a live event. For example, a first team name associated with the live event may be presented at 308. A second team name associated with the live event may be presented at 310. A current score associated with the live event may be presented at 312. In some embodiments, the game overview area 307 may present information associated with the live event within a timeline 314. Within the timeline 314, any suitable information related to the live event may be presented and formatted in chronological order (e.g., proceeding from top to bottom). This information may be formatted in any suitable manner.

By way of example, upon receive of event data, the synchronization engine 102 may initialize and/or update the user interface 300 with any suitable portion of the event data corresponding to the live event. For example, a start time determined from the event data may be utilized to update the timeline 314 with an entry corresponding to entry 316. The location of the entry 316 may be then associated with the start time of the live event.

As the live event progresses, various instances of supplemental data may be received by the synchronization engine 102. At a suitable time (e.g., upon receipt, when the supplemental data corresponds to a media stream being currently presented), the synchronization engine 102 may cause the user interface 300 to be updated with the received supplemental data. By way of example, supplemental data may be received that relates to a player substitution. The synchronization engine 102 may cause the supplemental data to be utilized to present entry 318 within the timeline 314. As depicted, the entry 318 may include a graphical icon 320 that visually indicates that the entry 318 relates to a substitution. The entry 318 may further indicate a player being taken out of the game (e.g., S. Shiplock) and/or a player number (e.g., "14") and a player that is being put in the game (e.g., J. App) and/or a corresponding player number (e.g., "90"). It should be appreciated that entry 318 is illustrative in nature and is not intended to limit the scope of the presentation of supplemental data. Any suitable format may be utilized to provide any suitable supplemental data within the timeline 314.

As the live event progresses, another instance of supplemental data may be received by the synchronization engine 102 that indicates that a game time has been adjusted (e.g., +3 seconds). Accordingly, the synchronization engine 102 may present the supplemental data within entry 321 of the timeline 314. Supplemental data corresponding to entry 322 may be received at a subsequent time and entry 322 presented on the timeline 314 in the manner depicted. Entry 322 may related to a penalty against a particular player within the live event. Supplemental data corresponding to entry 324 may be received at a subsequent time and entry 324 presented on the timeline 314 in the manner depicted. Entry 324 may related to a goal made by particular player within the live event. Supplemental data corresponding to entry 326 may be received at a subsequent time and entry 326 presented on the timeline 314 in the manner depicted. Entry 326 may related to a missed goal attempted by particular player within the live event.

It should be appreciated that each of the entries of the timeline 314 may include any suitable number and combination of text, graphical images/icons, colors, or the like. The entries of the timeline 314 may be spaced equally as depicted, or the entries of the timeline 314 may be spaced in relation to the timestamp of the supplemental data to which the respective entries relate. That is to say that the space between two entries may be determined based on a difference between the entries respective timestamps.

Figure 4:
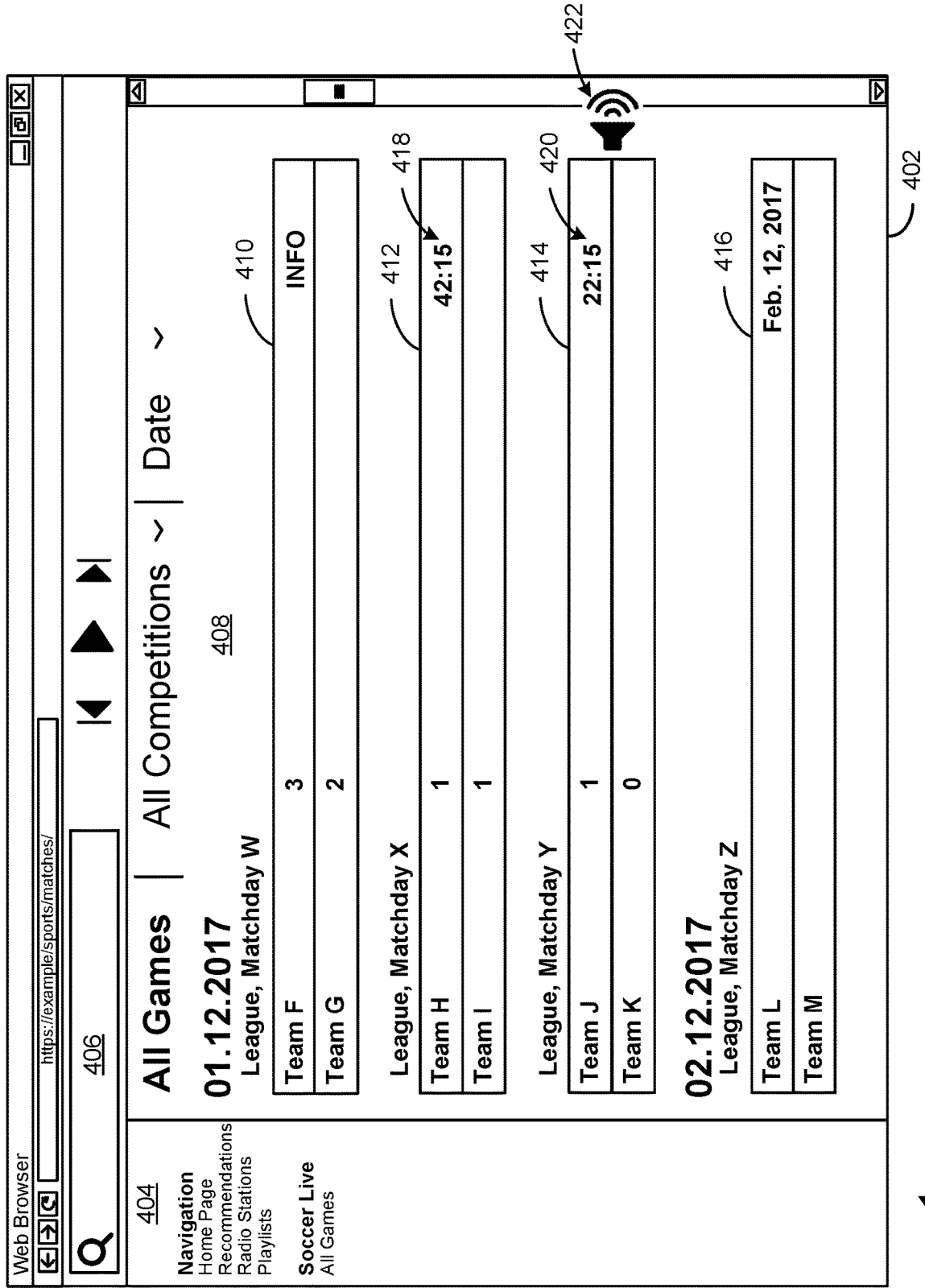
FIG. 4 is a schematic diagram illustrating yet another example user interface for presenting synchronized content, in accordance with at least one embodiment.

FIG. 4 is a schematic diagram illustrating yet another example user interface 400 for presenting synchronized content t, in accordance with at least one embodiment. User interface 400 may be provided by the synchronization engine 102 (or another suitable application operating on the client device 108 of FIG. 1). In at least one example, the user interface 400 may be presented via a network page 402. The user interface 400 may include any suitable number of areas such as a navigation area 404, a search area 406, and a games summary area 408. In some embodiments, the games summary area 408 may include multiple entries corresponding to individual games. For example, entries 410, 412, 414, and 416 may correspond to individual and distinct games. Each of the entries 410, 412, 414, and 416 may indicate any suitable information associated with the live event. As depicted, each of the entries 410, 412, 414, and 416 may include two team names, corresponding scores, and a link to navigate to a game overview page similar to the user interface 300 of FIG. 3, and/or a current play time, and/or a scheduled game day/time. By way of example, entry 410 may correspond to a game that has already occurred. Thus, entry 410 may indicate a final score of the game between Team F and Team G (e.g., Team F 3, Team G 2). In some embodiments, any suitable game information may be displayed within the entry 410. In some embodiments, a hyperlink (e.g., the "INFO" link of entry 410) may be provided that diverts the user to a network page that may provide additional game information (e.g., a similar interface as interface 302 of FIG. 3).

Entries 412 and 414 may each correspond to a game that is currently ongoing (e.g., Matchday X and Matchday Y, respectively). Thus, each of entries 412 and 414 may include a current play time (e.g., time 418 and time 420, respectively), or any suitable data related to the respective game. In the example depicted in FIG. 4, the user may be currently listening/watching a media stream (e.g., an audio stream) as depicted at 422. In this example, the user may be listening to the game "Matchday Y" between Team J and Team K. As the user is listening to the game, supplement data may be received by the synchronization engine 102 for both/either Matchday X and/or Matchday Y. Upon receiving supplemental data (e.g., a score update), the synchronization engine 102 may determine for which game the supplemental data relates. By way of example, the synchronization engine 102 may determine that the received supplemental data includes an event identifier and/or a topic name that corresponds to Matchday X, the game between Team H and Team I. The synchronization engine 102 may further determine that the audio stream of Matchday X is not currently being played. Accordingly, the synchronization engine 102 may present the supplemental data for Matchday X upon receipt.

As supplemental data is received for Matchday Y, the synchronization engine 102 may cause the supplemental data to be presented within entry 414 immediately or at a later time, based at least in part on the current play time of the media stream of Matchday Y. If supplemental data is received for Matchday Y that includes a timestamp that occurs at or before the current play time of the media stream of Matchday Y, the supplemental data may be presented immediately within entry 414. If, on the other hand, the supplemental data received for Matchday Y includes a timestamp that occurs after the current play time of the media stream, the synchronization engine 102 may delay the update of the entry 414 until the media stream catches up with the supplemental data. Thus, a score change within the entry 414 indicating that a goal has been made is prevented from occurring before the user has a chance to hear the goal take place within the media stream.

Interface 400 may additionally, or alternatively, include one or more entries similar to entry 416. Entry 416 is intended to depict a game that is scheduled to occur in the future. In some embodiments, various game information may be displayed in entry 416. For example, the associated team names and a scheduled game day and/or time may be displayed (e.g., time 424). Any suitable information related to the game may be provided within the entry 416 and/or via a hyperlink provided with the entry 416.

Figure 5:
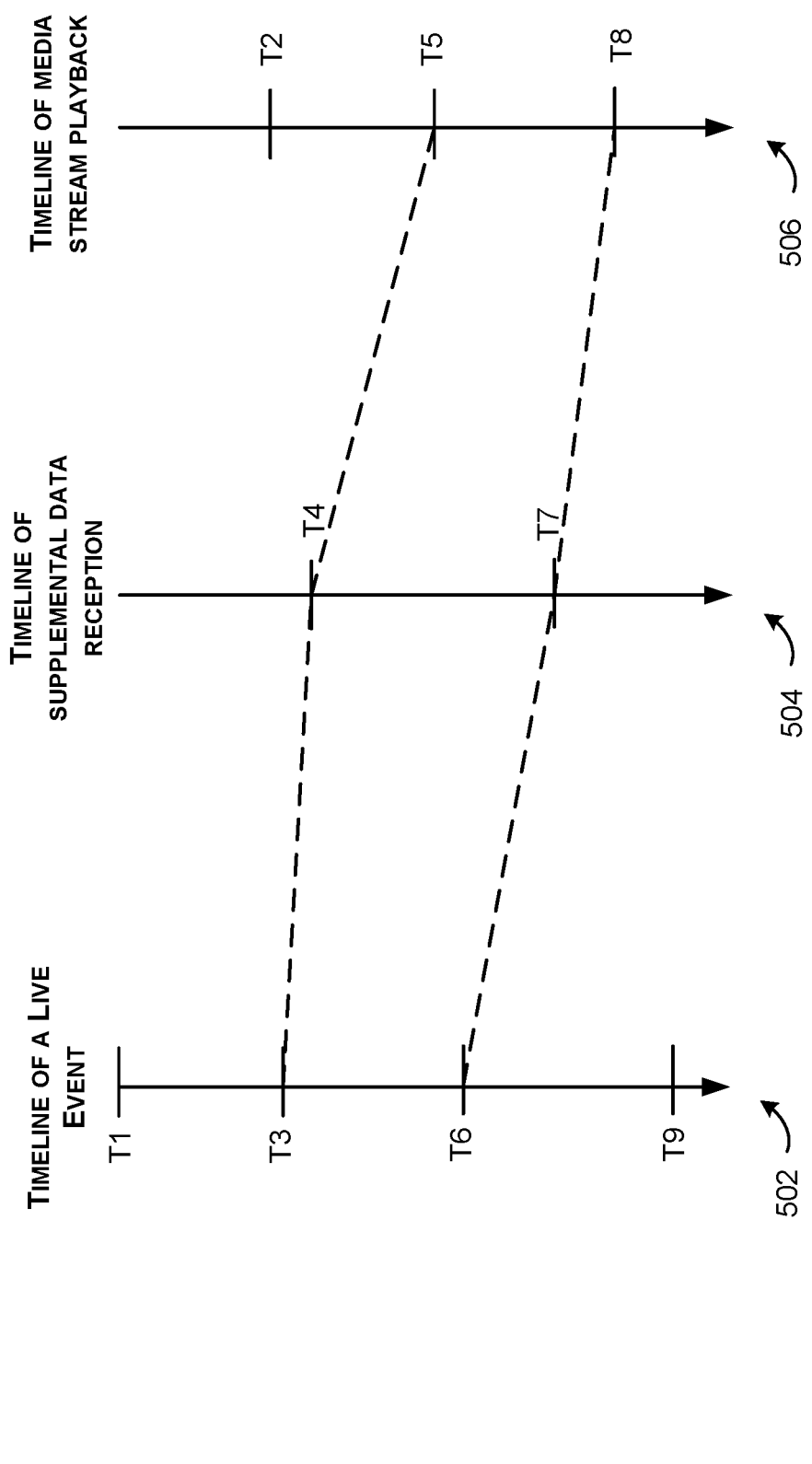
FIG. 5 is a schematic diagram illustrating an example method for implementing aspects of the synchronization engine, in accordance with at least one embodiment.

FIG. 5 is a schematic diagram illustrating an example method 500 for implementing aspects of the synchronization engine, in accordance with at least one embodiment. Timeline 502 is intended to relate to a live event. Timeline 504 is intended to reception of supplemental data related to the event. Timeline 506 is intended to relate to playback of a media stream via a client device (e.g., the client device 108 of FIG. 1). As depicted, each of the timelines 502, 504, and 506 relate to a same period of time.

As a non-limiting example, a live event (e.g., a soccer match) may begin at T1 (e.g., 2:00:00 PM). At T1, event data may be transmitted regarding the live event. By way of example, event data including, but not limited to a start time, one or more team names, a starting score, player names, player statistics, a venue identifier (e.g., a stadium name), and the like, may be broadcasted. In some embodiments, the event data may be provided by the media-stream provider computer(s) 104 of FIG. 1 and received by the client device 108 of FIG. 1 via the content provider computer(s) 110 of FIG. 1. In some examples, the synchronization engine 102 of FIG. 1 may cause the event data to be stored in memory on the computing device.

At T2, a media stream corresponding to the live event may begin playback on a computing device. The difference between T1 and T2 may be referred to as "the offset value." As a non-limiting example, the live event may begin at 2:00:00 PM (T1) and the media stream may begin playing on the computing device at 2:00:10 PM (T2). Thus, the offset value may be equal to ten seconds indicating that the media stream is ten seconds behind the live event.

At T3, a sub-event (e.g., a player substitution, goal, foul/penalty, game time delay, etc.) may occur during the live event. Supplemental data related to the sub-event may be transmitted/provided to one or more client devices. The supplemental data may include any suitable information corresponding to the sub-event. By way of example, supplemental data corresponding to a player substitution may include a name of a first player to be added to the field, a name of a second player being removed from the field, and a timestamp associated with the time within the live event at which the substitution occurred. The supplemental data may be transmitted via one or more push notifications to any suitable number of client devices.

At T4, the supplemental data may be received (e.g., via a push notification) by the synchronization engine 102 (e.g., from the supplemental-data provider computer(s) 106 and/or the content provider computer(s) 110 of FIG. 1). The synchronization engine 102 may determine (e.g., utilizing the event identifier and/or the topic name of the supplemental data) that the supplemental data relates to the media stream being played on the computing device. Accordingly, the synchronization engine 102 may then calculate a current play time of the media stream. By way of example, the start time of the live event (T1) may be added to a current play duration of the media stream (e.g., 30 seconds of media stream has already presented) to determine a current play time of the media stream. The synchronization engine 102 may then compare the current play time to the timestamp associated with the supplemental data received at T4 to determine that the supplemental data relates to a time within the live event that has not yet transpired in the media stream. That is, the timestamp indicates a time that occurs after the current play time. Accordingly, the supplemental data may be stored without being presented on the computing device.

At T5, the synchronization engine 102 may determine that a current play time of the media stream is equal to or greater than the time indicated by the timestamp of the stored supplemental data that was received at T4. Accordingly, the synchronization engine 102 may cause the supplemental data to be presented on the computing device at substantially the same time as the sub-event occurs within the media stream. As a non-limiting example, as the user is listening to an audio media stream and hears a commentator discuss player A being substituted for player B, the interface on the computing device may be updated to provide text, graphical icons, and/or text to indicate that the substitution has occurred.

At T6, another sub-event (e.g., a player substitution, goal, foul/penalty, game time delay, etc.) may occur in the live event. Supplemental data related to the sub-event may be transmitted/provided to one or more client devices. The supplemental data may include any suitable information corresponding to the sub-event. By way of example, the sub-event may correspond to a goal and the supplemental data corresponding to the goal may include a name of a player who made the goal, an updated score, and a timestamp associated with the time within the live event at which the goal occurred. The supplemental data may be transmitted via one or more push notifications to any suitable number of client devices.

At T7, the supplemental data may be received (e.g., via a push notification) by the synchronization engine 102 (e.g., from the supplemental-data provider computer(s) 106 and/or the content provider computer(s) 110 of FIG. 1). The synchronization engine 102 may determine (e.g., utilizing the event identifier and/or the topic name of the supplemental data) that the supplemental data relates to the media stream being played on the computing device. Accordingly, the synchronization engine 102 may then calculate a current play time of the media stream. By way of example, the start time of the live event (T1) may be added to a current play duration of the media stream (e.g., two minutes 30 seconds of media stream has already presented) to determine a current play time of the media stream. The synchronization engine 102 may then compare the current play time to the timestamp associated with the supplemental data received at T7 to determine that the supplemental data relates to a time within the live event that has not yet transpired in the media stream. That is, the timestamp indicates a time that occurs after the current play time. Accordingly, the supplemental data may be stored without being presented on the computing device.

At T8, the synchronization engine 102 may determine that a current play time of the media stream is equal to or greater than the time indicated by the timestamp of the stored supplemental data that was received at T7. Accordingly, the synchronization engine 102 may cause the supplemental data to be presented on the computing device at substantially the same time as the sub-event occurs within the media stream. As a non-limiting example, as the user is listening to the audio of a media stream and hears a commentator yell "GOAL!" the interface on the computing device may be updated to provide text and/or graphical icons to indicate that the goal has occurred. For example, the score displayed (and any other suitable information presented by the interface) may be updated to reflect the goal.

Any suitable number of sub-events may transpire in the live event. As supplemental data for each sub-event is received by the synchronization engine 102, it may be stored until such time as it is determined that the media stream is at a current play time that is greater to or equal to a time indicated by the timestamp of the supplemental data. The process described above may continue until the live event has ended at T9. In some examples, an end time may be transmitted at T9 to any suitable number of client devices (e.g., via push notification). At any suitable time after the media stream has reached the end time and/or the user has ceased playback of the media stream, the synchronization engine 102 may be configured to delete any stored event data and/or supplemental data associated with the live event.

Figure 6:
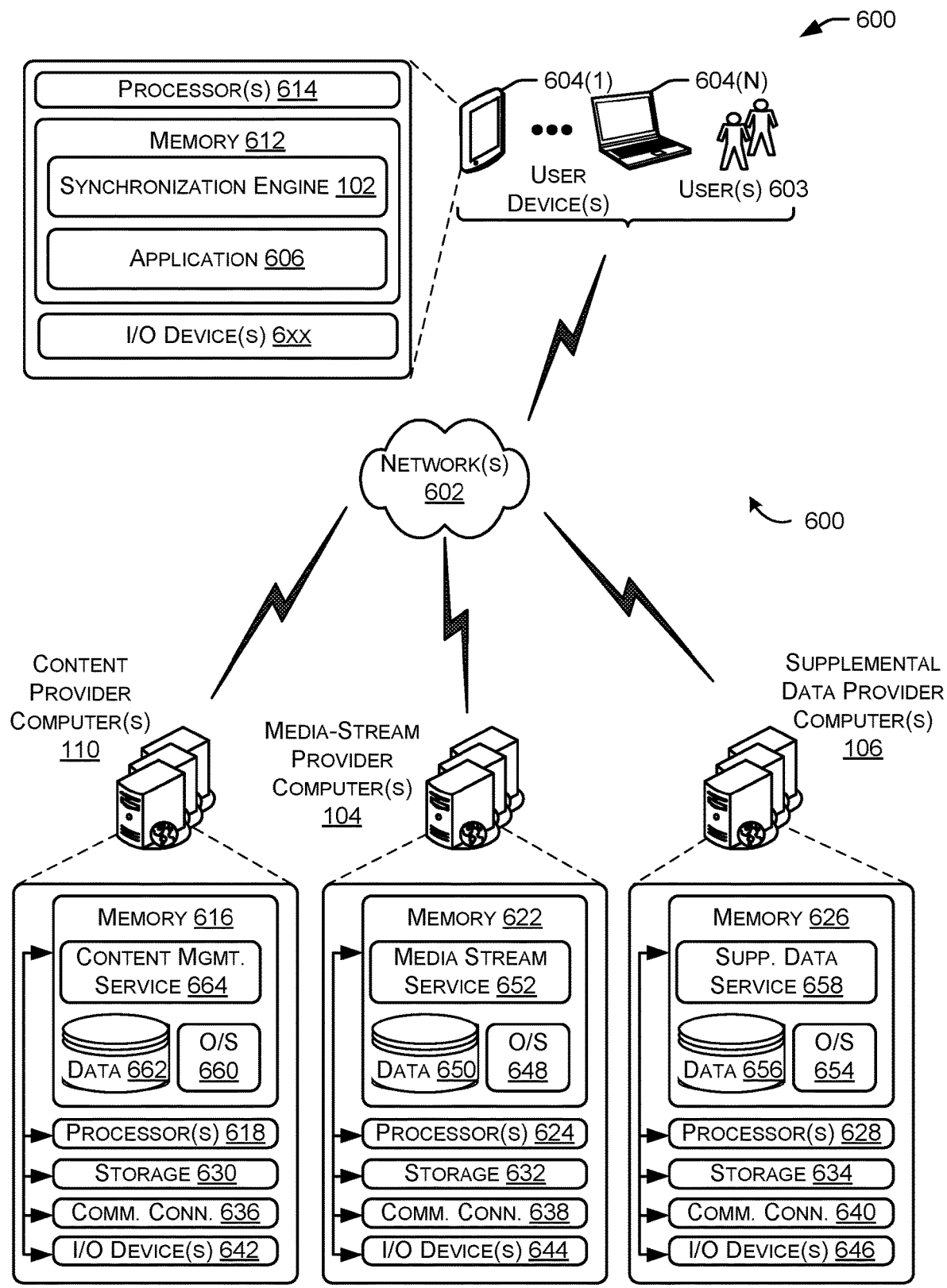
FIG. 6 is an example system for implementing aspects of the synchronization engine, in accordance with at least one embodiment.

FIG. 6 is an example system 600 for implementing aspects of the synchronization engine (e.g., the synchronization engine 102 of FIG. 1), in accordance with at least one embodiment. The system 600 may include one or more media-stream provider computer(s) 104, one or more supplemental-data provider computer(s) 106, and/or one or more content provider computer(s) 110. The media-stream provider computer(s) 104 may be configured to provide a media stream including audio and/or video data related to a live event. The supplemental-data provider computer(s) 106 may be configured to provide supplemental data (e.g., text, sounds, graphics, etc.) related to a live event. The content provider computer(s) 110 may be configured to receive a media stream or supplemental data from the media-stream provider computer(s) 104 or the supplemental-data provider computer(s) 106, respectively. Although in some examples, the content provider computer(s) 110 may be the same or different computers as the media-stream provider computer(s) 104 and/or the supplemental-data provider computer(s) 106. Accordingly, the content provider computer(s) 110 may facilitate forwarding media stream and/or supplemental data corresponding to an event, or the content provider computer(s) 110 may be an originator of the media stream and/or supplemental data.

The content provider computer(s) 110, media-stream provider computer(s) 104, and supplemental-data provider computer(s) 106 may be in communication with one another via one or more network(s) 602 (e.g., the network 112 of FIG. 1). Similarly, the user devices 604(1)-604(N) (hereinafter referred to as "user device(s) 604") may be in communication with the content provider computer(s) 110, media-stream provider computer(s) 104, and/or supplemental-data provider computer(s) 106 via the network(s) 602. Client device 108 of FIG. 1 may be an example of the user device(s) 604.

In some examples, the network(s) 602 may include any one or a combination of many different types of networks, such as cable networks, the Internet, wireless networks, cellular networks, and other private and/or public networks. It should be appreciated that communication between the content provider computer(s) 110, the media-stream provider computer(s) 104, the supplemental-data provider computer(s) 106, and/or the user device(s) 604 may occur over a landline phone, via a kiosk, or in any other suitable manner.

The user device(s) 604 (e.g., the client device 108) may be any suitable type of computing device such as, but not limited to, a mobile phone, a smartphone, a personal digital assistant (PDA), a laptop computer, a desktop computer, a thin-client device, a tablet PC, an electronic book (e-book) reader, etc. In some examples, the user device(s) 604 may be in communication with the content provider computer(s) 110, the media-stream provider computer(s) 104, and/or the supplemental data provider computer(s) 106, via the network(s) 602, or via other network connections.

In one illustrative configuration, the user device(s) 604 may include at least one memory 612 and one or more processing units (or processor(s) 614). The processor(s) 614 may be implemented as appropriate in hardware, computer-executable instructions, firmware, or combinations thereof. Computer-executable instruction or firmware implementations of the processor(s) 614 may include computer-executable or machine-executable instructions written in any suitable programming language to perform the various functions described.

The memory 612 may store program instructions that are loadable and executable on the processor(s) 614, as well as data generated during the execution of these programs. The memory 612 may include an operating system, one or more data stores, and/or one or more application programs, modules, or services for implementing the features disclosed herein including one or more features of the synchronization engine 102. Depending on the configuration and type of user computing device, the memory 612 may be volatile (such as random access memory (RAM)) and/or non-volatile (such as read-only memory (ROM), flash memory, etc.). The user device(s) 604 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 612 may include multiple different types of memory, such as static random access memory (SRAM), dynamic random access memory (DRAM), or ROM.

Turning to the contents of the memory 612 in more detail, the memory 612 may include an operating system and one or more application programs, modules, or services for implementing the features disclosed herein, such as via the application 606 and/or the synchronization engine 102 of FIG. 1.

As described above, the application 606, operating on each of the user device(s) 604 may allow the user(s) 603 to play media stream provided by the media-stream provider computer(s) 104 and/or the content provider computer(s) 110. In some examples, the content provider computer(s) 110, perhaps arranged in a cluster of servers or as a server farm, may host the application 606 and/or cloud-based software services. Other server architectures may also be used to host the application 606 and/or cloud-based software services. The application 606 may be capable of handling requests from the user(s) 603 and serving, in response, various user interfaces that can be rendered at the user device(s) 604. For example, the application 606 can present any suitable type of website and/or interface to enable the user(s) 603 to select options to play one or more media streams. The application 606 may further be configured to present one or more media streams and/or supplemental data on the user device(s) 604 (e.g., via a display and/or a speaker of the user device(s) 604. The described techniques can similarly be implemented outside of the application 606, such as with other applications running on the user device(s) 604. In some embodiments, the synchronization engine 102 may operate as a component of the application 606 or as a standalone software and/or hardware module of the user device(s) 604.

In some aspects, the content provider computer(s) 110, the media-stream provider computer(s) 104, and the supplemental-data provider computer(s) 106 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the content provider computer(s) 110, the media-stream provider computer(s) 104, and/or the supplemental-data provider computer(s) 106 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. The content provider computer(s) 110, the media-stream provider computer(s) 104, and the supplemental-data provider computer(s) 106 may individually include one or more servers, perhaps arranged in a cluster, as a server farm, or as individual servers not associated with one another. These servers may be configured to implement the techniques described herein as part of an integrated computing environment.

In one illustrative configuration, the content provider computer(s) 110 may include at least one memory 616 and one or more processing units (or processor(s) 618). The media-stream provider computer(s) 104 may include at least one memory 622 and one or more processing units (or processor(s)) 624. The supplemental-data provider computer(s) 106 may include at least one memory 626 and one or more processing units (or processor(s) 628). The processor(s) 618, 624, and 628 may be implemented as appropriate in hardware, computer-executable instructions, firmware, or combinations thereof. Computer-executable instruction or firmware implementations of the processor(s) 618, 624, and 628 may include computer-executable or machine-executable instructions written in any suitable programming language to perform the various functions described.

Each of the memories 616, 622, and 626 may store program instructions that are loadable and executable on the respective processors 618, 624, and 628, as well as data generated during the execution of these programs. Depending on the configuration and type of service by the respective computers, the memories 616, 622, and 626 may be volatile (such as RAM) and/or non-volatile (such as ROM, flash memory, etc.). The content provider computer(s) 110, media-stream provider computer(s) 104, and supplemental-data provider computer(s) 106 may also include additional storage (e.g., the storages 630, 632, and 634), which may include removable storage and/or non-removable storage. The storages 630, 632, and 634 may include, but are not limited to, magnetic storage, optical disks and/or tape storage. The disk drives and their associated computer-readable media may provide non-volatile storage of computer-readable instructions, data structures, program modules, and other data. In some implementations, the memories 616, 622, and 626 may include multiple different types of memory, such as SRAM, DRAM, or ROM.

The memories 616, 622, and 626, the storages 630, 632, and 634, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory memories 616, 622, and 626 and the storages 630, 632, and 634 are all examples of computer storage media. Additional types of computer storage media that may be present in the content provider computer(s) 110, the media-stream provider computer(s) 104, and/or the supplemental-data provider computer(s) 106 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the respective provider computers. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The content provider computer(s) 110 may also contain communications connection(s) 636. The media-stream provider computer(s) 104 may also contain communication connection(s) 638. The supplemental-data provider computer(s) 106 may also contain communication connection(s) 640. The communication connections 636, 638, and 640 may allow the corresponding provider computer to communicate with a stored database, another computing device or server, user terminals and/or other devices on the network(s) 602. The content provider computer(s) 110 may also include I/O device(s) 642. The media-stream provider computer(s) 104 may also include I/O device(s) 644. The supplemental-data provider computer(s) 106 may also include I/O device(s) 646. The I/O device(s) 642, 644, and/or 646 may include devices such as a keyboard, a mouse, a pen, a voice input device, a touch input device, a display, speakers, a printer, etc.

Turning to the contents of the memory 622, the memory 622 may include an operating system 648, one or more data stores 650, and/or one or more application programs, modules, or services such as a media stream service 652. The media stream service 652 may be configured to provide one or more media streams associated with one or more live events. The media stream service 652 may receive information from a media stream source or the media stream service 652 may originate the one or more media streams.

Turning to the contents of the memory 626, the memory 626 may include an operating system 654, one or more data stores 656, and/or one or more application programs, modules, or services such as a supplemental data service 658. The supplemental data service 658 may be configured to provide supplemental data (e.g., text, audio, graphics, video, etc.) associated with one or more live events. The supplemental data provided may be generated by the supplemental-data provider computer(s) 106 and/or the supplemental data (or a portion thereof) may be received and/or obtained by other devices (e.g., sensor devices, supplemental data feeds, user input such as text entered by a commentator, and the like). The supplemental data service 658, in some embodiments, may be configured to timestamp the supplemental data (or otherwise include a time with the supplemental data) that indicates a time occurring within an event to which the supplemental data relates.

Turning to the contents of the memory 616, the memory 616 may include an operating system 660, one or more data stores 662, and/or one or more application programs, modules, or services such as a content management service 664. The content management service 664 may be configured to provide media streams and/or supplemental data (e.g., text, audio, graphics, video, etc.) associated with one or more live events. The media streams and/or supplemental data provided by the content management service 664 may be received from another source (e.g., the media-stream provider computer(s) 104 and/or the supplemental-data provider computer(s) 106) or the media streams and/or supplemental data may be generated by the content provider computer(s) 110. In some embodiments, the content management service 664 may be configured to timestamp supplemental data (or otherwise include a time with the supplemental data) that indicates a time occurring within an event to which the supplemental data relates.

In some embodiments, the content management service 664 may be configured to provide supplemental data via a push notification. The content management service 664 may be part of a cloud platform that supports Hypertext Transmission Protocol (HTTP), web sockets, Message Queuing Telemetry Transport (MQTT) protocol, and/or any suitable push notification protocol. The content management service 664 may be configured to determine a specific push notification protocol to utilize based at least in part on the platform utilized by the user device that will receive the push notification. By way of example, the user(s) 603 may utilize the user device(s) 604 to access an interface provided by the synchronization engine 102 and/or the application 606. Using the interface provided, the user(s) 603 may select one or more options (e.g., clicks a button to play a particular media stream corresponding to a sporting event) that causes the user device(s) 604 to be registered to a particular event (e.g., the sporting event) associated with an event identifier and/or a topic name. When supplemental data is received, the content management service 664 may determine what user device(s) 604 are subscribed to the event identifier and/or topic name and transmit one or more push notifications to the subscribed user device(s) 604. The one or more push notifications may be formatted according to particular aspects of the user device(s) 604 such as the platform utilized by each device. Accordingly one user device may receipt a push notification formatted utilizing a MQTT protocol, while another push notification received by a second user device may receive a push notification formatted according to a different push notification protocol. In this manner, the content management service 664 may be configured to provide push notifications according to the specific platform of the user device(s) 604.

In some embodiments, the synchronization engine 102 and/or the application 606 may be configured to receive/obtain a media stream from the content management service 664 and/or the media stream service 652 and provide the media stream on a display and/or speaker of the user device(s) 604. The synchronization engine 102 may be further configured to receive supplemental data provided by the content management service 664 (e.g., via a push notification) and/or the supplemental data service 658. The synchronization engine 102 is discussed in more detail below with respect to FIG. 7.

Figure 7:
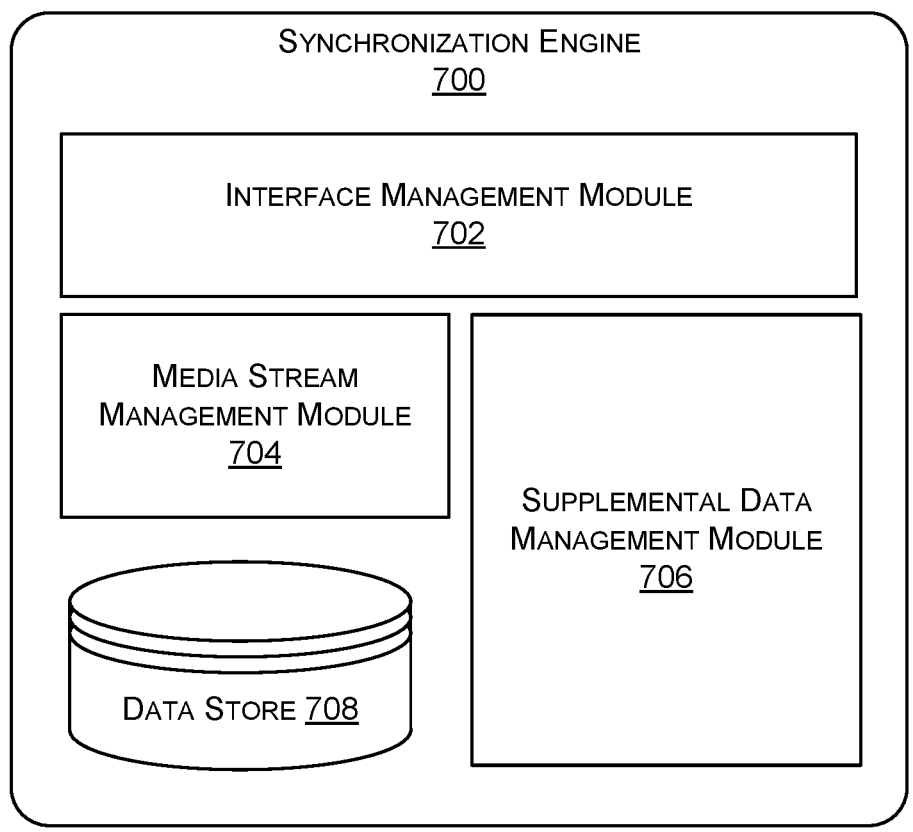
FIG. 7 illustrates in greater detail the components of an example synchronization engine, in accordance with at least one embodiment.

FIG. 7 illustrates in greater detail the components of an example synchronization engine 700 (e.g., and example of the synchronization engine 102 of FIGS. 1 and 6), in accordance with at least one embodiment. As shown, the example embodiment includes various modules including an interface management module 702, a media stream management module 704, and a supplemental data management module 706, or any suitable combination of the above, although additional modules may be included within the synchronization engine 700. It should be appreciated that each module of FIG. 7 may be executed on a single computer, and or each component, or sets of components may be executed on separate computers. The synchronization engine 700 may include any appropriate combination of hardware and/or software suitable to provide the described functionality.

In at least one embodiment, the interface management module 702 may be configured to cause a processor to provide one or more interfaces via a computing device on which the synchronization engine 700 operates (e.g., the client device 108 of FIG. 1, the user device(s) 604 of FIG. 6). The interfaces may enable a user to select an option to listen and/or view a media stream associated with a live event. The option to listen/view the media stream may be selected before or after the live event has commenced. In some embodiments, the interface management module 702 may receive user selections and/or input entered via the provided interfaces. By way of example, the user may select an option to listen to an audio stream of a particular live event (e.g., a sporting event). The interface management module 701 may receive information indicating the selection. In some example, the interface management module 701 may determine an event identifier and/or a topic name associated with the selected media stream. For example, the interface management module 701 may access a schedule and/or event data to identify an event identifier and/or a topic name for the selected event. In some embodiments, the interface management module 701 may be configured to cause the identified event identifier and/or topic name to be associated with a user of the computing device and/or the computing device on which the synchronization engine 700 operates.

In at least one embodiment, the interface management module 702 may cause the processor to provide supplemental data on a display and/or a speaker of the computing device on which the synchronization engine 700 operates. For example, the supplemental data may be provided by the interfaces 200, 300, and 400 above with respect to FIGS. 2, 3, and 4, respectively. In some cases, the supplemental data may be provided by the supplemental data management module 706.

In at least one embodiment, the media stream management module 704 may include computer code that, when executed by a processor, causes the processor to receive one or more media streams (and/or portions of one or more media streams). These media streams may be received from, for example, the content provider computer(s) 110 and/or the media-stream provider computer(s) 104 of FIGS. 1 and 6. In at least one embodiment, the media stream management module 704 may provide the received media stream to a speaker and/or display of a client device (e.g., the client device 108 of FIG. 1). In some embodiments, the media stream management module 704 may be configured to cause the processor to receive and/or obtain event data corresponding to an event (e.g., a live event). For example, event data may be received and/or obtained from the media-stream provider computer(s) 104 and/or the content provider computer(s) 110 of FIGS. 1 and 6. The event data may include a start time associated with the event (e.g., 2:00:00 PM). In some embodiments, the event data may be associated with an event identifier and/or topic name. At least some portion of the event data (e.g., the start time, the event identifier, the topic name, etc.) may be stored by the media stream management module 704 in the data store 708. The data store 708 may be internal or external to the synchronization engine 700. In at least one embodiment, the data store 708 may reside within memory 612 of FIG. 6.

In at least one embodiment, the media stream management module 704 may cause the processor to provide the received media stream via a display and/or a speaker of the computing device on which the synchronization engine 700 operates. For example, the media stream management module 704 may cause an audio stream to be provided via a speaker of the computing device. As another example, the media stream management module 704 may cause a video and corresponding audio to be provided via a display and a speaker of the computing device, respectively. Thus, the media stream management module 704 may enable a user of the computing device to listen and/or watch a media stream associated with a live event (e.g., a sporting event).

In at least one embodiment, the supplemental data management module 706 may include computer code that, when executed by a processor, causes the processor to receive one or more instances of supplemental data. As discussed above, the supplemental data may relate to a live event. The supplemental data may be received from, for example, the content provider computer(s) 110 and/or the supplemental-data provider computer(s) 106 of FIGS. 1 and 6. In at least one embodiment, the supplemental data management module 706 may provide the received supplemental data to the interface management module 702 and/or the supplemental data management module 706 may store the supplemental data in the data store 708. In some embodiments, supplemental data management module 706 may associate and store the supplemental data such that a timestamp included with the received supplemental data may be used to retrieve the associated supplemental data. The supplemental data may also include an event identifier and/or a topic name associated with the live event which may be used to retrieve the supplemental data from the data store 708. In at least one embodiment, the supplemental data may be received via a push notification formatted according to any suitable push notification protocol.

In at least one embodiment, the supplemental data management module 706 may cause the processor to determine whether or not a media stream is being provided by the media stream management module 704. If a media stream is not currently being provided (e.g., the user is not currently listening to and/or watching an event via a media stream), the supplemental data management module 706 may be configured to provide the received supplemental data to the interface management module 702. The interface management module 702 may then present the supplemental data via a display and/or speaker of the computing device at any suitable time. By way of example, the supplemental data may be presented by the interface management module 702 within interfaces 200, 300, and 400, in the manner discussed above in connection with FIGS. 2, 3, and 4, respectively.

In some embodiments, the supplemental data management module 706 may determine that a media stream is currently being provided by the media stream management module 704. That is, the use is currently listening to and/or watching an event via a media stream. Accordingly, the supplemental data management module 706 may be configured to determine whether the received supplemental data is associated with the media stream currently being played on the computing device. For example, the supplemental data management module 706 may be configured to compare the event identifier and/or topic name of the received supplemental data to the event identifier and/or topic name of the media stream being played. If the comparison indicates a match, the supplemental data management module 706 may identify (e.g., by submitting a request to the media stream management module 704 or by any suitable manner) a current play duration (e.g., 30 seconds) of the media stream being played. The current play duration of the media stream may be added to the start time of the event retrieved from the event data stored in the data store 708 to generate a current play time of the media stream being played.

The supplemental data management module 706 may additionally identify a timestamp of the supplemental data and compare the timestamp to the current play time of the media stream being played. If the comparison indicates a timestamp that occurs at a time that is at or before the current play time of the media stream being played, then the supplemental data management module 706 may provide the supplemental data to the interface management module 702. The interface management module 702 may then present the supplemental data via a display and/or a speaker of the computing device on which the synchronization engine 700 operates. If, however, the timestamp indicates a time that occurs after the current play time, the supplemental data management module 706 may be configured to store the supplemental data in the data store 708 or another suitable storage location.

The supplemental data management module 706 may determine an offset value between the current play time and the timestamp and trigger further processing of the supplemental data when a duration of time corresponding to the offset value has expired. By way of example, the supplemental data management module 706 may set a timer, or utilize any suitable scheduling mechanism to cause the supplemental data to be provided to the interface management module 702 when the current play time reaches the time indicated by the timestamp of the supplemental data. The interface management module 702 may then present the provided supplemental data on a display and/or a speaker of the computing device.

As another example, the supplemental data management module 706 may be configured to periodically access the data store 708 to determine whether or not supplemental data exists that is associated with the same event identifier and/or topic name as the media stream. The supplemental data management module 706 may access the data store 708 to conduct this determination at any suitable time or at any suitable periodic rate (e.g., every second, every two second, every 50 milliseconds, etc.). If supplemental data is identified as being associated with the same event identifier and/or topic name as the media stream being played, the supplemental data management module 706 may be configured to retrieve/remove that supplemental data from the data store 708. The retrieved supplemental data may be provided to the interface management module 702 for presentation on a display and/or speaker of the computing device.

Figure 8:
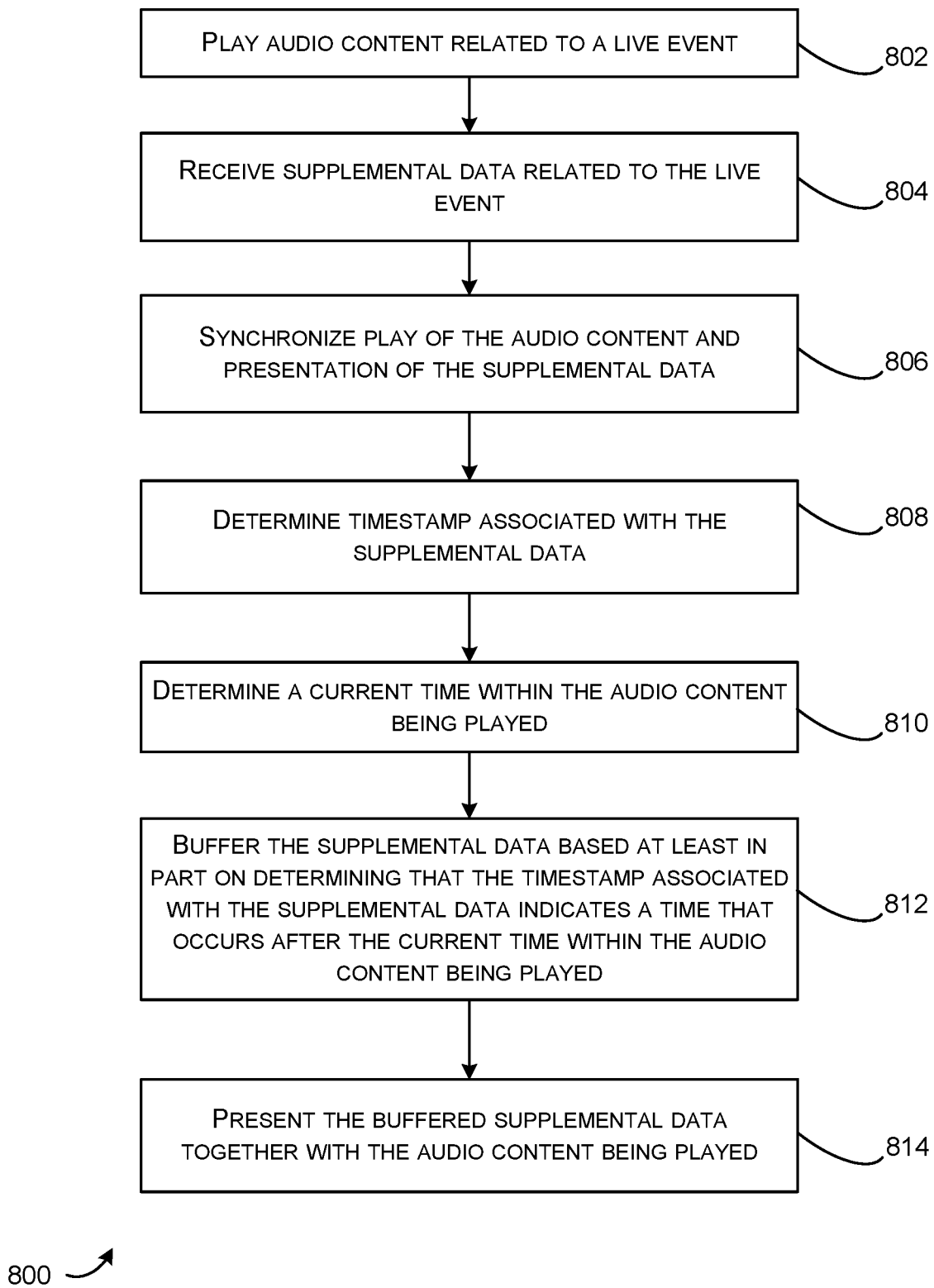
FIG. 8 is a flowchart illustrating an example method for synchronizing content utilizing the synchronization engine, in accordance with at least one embodiment.

FIG. 8 is a flowchart illustrating an example method 800 for synchronizing content utilizing the synchronization engine, in accordance with at least one embodiment. The method 800 may be performed by one or more components of the synchronization engine 102 of FIGS. 1, 6, and 7. The method 800 may performed in any suitable order. It should be appreciated that the method 800 may include a greater number or a lesser number of steps than that depicted in FIG. 8.

The method may begin at 802, where audio content related to a live event may be played (e.g., by the media stream management module 704 of FIG. 7). In some examples, the audio content may be played by an audio output device (e.g., a speaker of the client device 108 of FIG. 1). The audio content may be related to a live event. For example, the live event may be a sporting event such as a football game that is being streamed live.

At 804, supplemental data related to the live event may be received (e.g., by the supplemental data management module 706 of FIG. 7). By way of example, the supplemental data may comprise information related to a player substitution, goal/score, foul/penalty, game time delay, missed attempt, or any suitable information that may pertain to a sub-event occurring during the course of the live event. In some embodiments, the supplemental data may be associated with a timestamp that corresponds to a particular time during the live event to which the supplemental data relates.

At 806, playing of the audio content and presentation of the supplemental data may be synchronized (e.g., by the supplemental data management module 706). In some embodiments, synchronizing includes the steps of 808-814.

At 808, as part of synchronizing the playing of the audio content and the presentation of the supplemental data, a timestamp associated with the supplemental data may be determined (e.g., by the supplemental data management module 706). The timestamp may correspond to a particular time during the live event to which the supplemental data relates.

At 810, a current time of the audio content being played may be determined (e.g., by the supplemental data management module 706 of FIG. 7). By way of example, a play duration corresponding to an amount of time for which the audio content has already played may be determined. This play duration may be added to a start time associated with the event in order to calculate the current play time. The current time provides a "stadium time" or, in other words, a time within playback of the audio content that is relative to a time at which a sub-event occurred within the live event.

At 812, the supplemental data may be buffered (e.g., supplemental data management module 706 of FIG. 7 within the data store 708 of FIG. 7). In at least one embodiment, the supplemental data may be stored based at least in part on a comparison of the timestamp and the current play time. By way of example, the supplemental data may be stored when the timestamp associated with the supplemental data corresponds to a time that occurs after the current time within the audio content being played.

At 814, the buffered supplemental data may be presented (e.g., by the interface management module 702 of FIG. 7) together with the audio being presented (e.g., by the media stream management module 704 of FIG. 7). For example, the buffered supplemental data may be presented based at least in part on identifying that the current time within the audio content being played occurs at or after the timestamp associated with the supplemental data.

Figure 9:
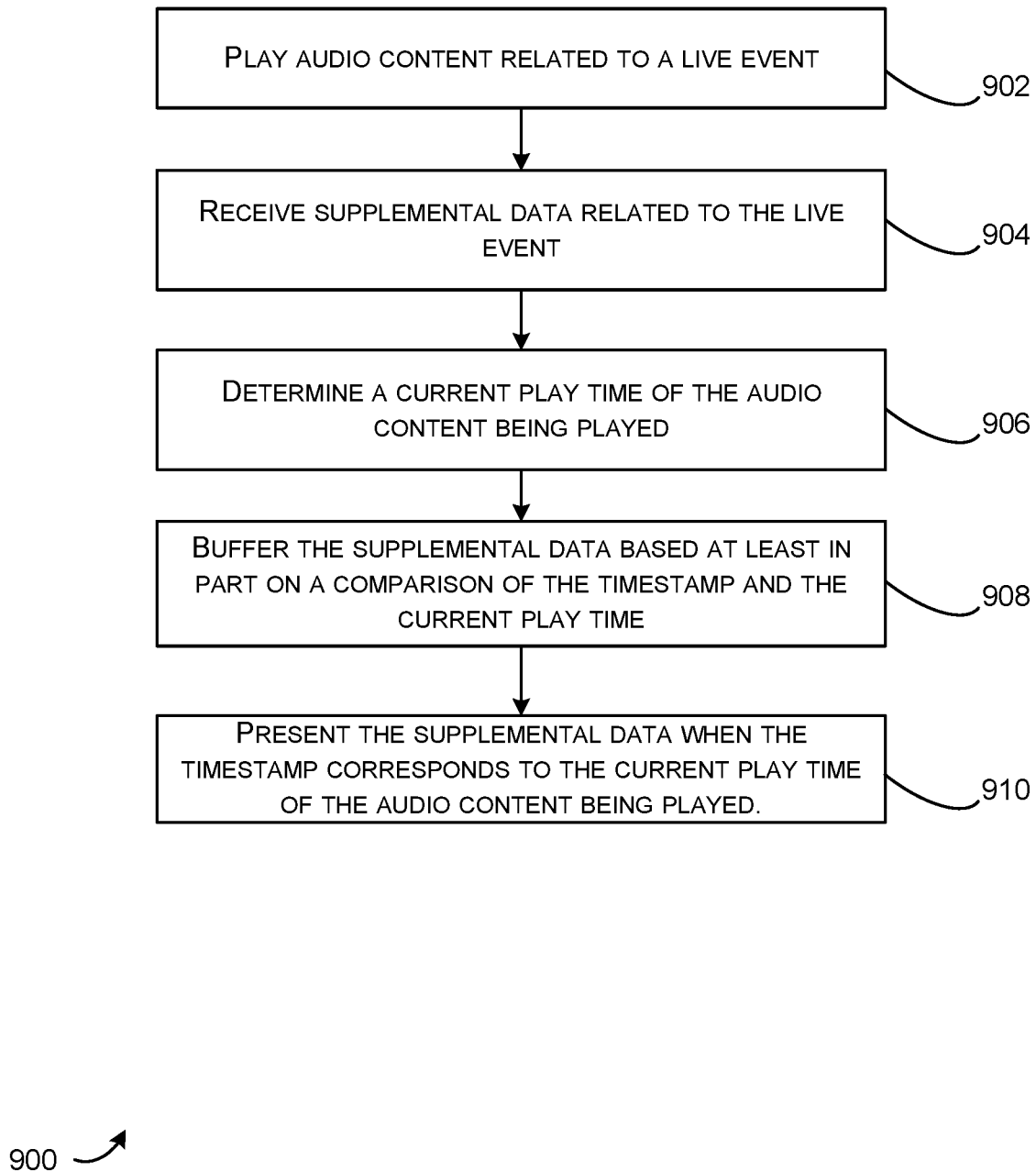
FIG. 9 is a flowchart illustrating another example method for synchronizing content utilizing the synchronization engine, in accordance with at least one embodiment.

FIG. 9 is a flowchart illustrating another example method 900 for synchronizing content utilizing the synchronization engine, in accordance with at least one embodiment. The method 900 may be performed by one or more components of the synchronization engine 102 of FIGS. 1, 6, and 7. The synchronization engine 102 may operate on a client device. The client device may comprise a processor and a memory storing computer-readable instructions that, upon execution by the processor, cause the processor to perform the method. The method 900 may performed in any suitable order. It should be appreciated that the method 900 may include a greater number or a lesser number of steps than that depicted in FIG. 9.

The method may begin at 902, where audio content related to a live event may be played (e.g., by the media stream management module 704 of FIG. 7). In some examples, the audio content may be played by an audio output device (e.g., a speaker of the client device 108 of FIG. 1). The audio content may be related to a live event. For example, the live event may be a sporting event such as a football game that is being streamed live.

At 904, supplemental data related to the live event may be received (e.g., by the supplemental data management module 706 of FIG. 7). By way of example, the supplemental data may comprise information related to a player substitution, goal/score, foul/penalty, game time delay, missed attempt, or any suitable information that may pertain to a sub-event occurring during the course of the live event. In some embodiments, the supplemental data may be associated with a timestamp that corresponds to a particular time during the live event to which the supplemental data relates.

At 906, a current play time of the audio content being played may be determined (e.g., by the supplemental data management module 706 of FIG. 7). By way of example, a play duration corresponding to an amount of time for which the audio content has already played may be determined. This play duration may be added to a start time associated with the event in order to calculate the current play time. The current play time provides a "stadium time" or, in other words, a time within playback of the audio content that is relative to a time at which a sub-event occurred within the live event.

At 908, the supplemental data may be buffered (e.g., supplemental data management module 706 of FIG. 7 within the data store 708 of FIG. 7). In at least one embodiment, the supplemental data may be stored based at least in part on a comparison of the timestamp and the current play time. By way of example, the supplemental data may be stored when the timestamp indicates a time that occurs after the current play time.

At 910, the supplemental data may be presented (e.g., by the interface management module 702 of FIG. 7) when the timestamp corresponds to the current play time of the audio content being played. A determination of whether the timestamp corresponds to the current play time may be conducted in the various manners discussed above.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets)

or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   playing, by an audio output device of a computing device, audio content of a live event while the live event is occurring; and
   while the audio content is being played:
      receiving, by the computing device, a push notification comprising supplemental data related to the live event; and
      synchronizing the playing of the audio content and presentation of the supplemental data received in the push notification, wherein synchronizing the playing of the audio content and the presentation of the supplemental data received in the push notification comprises:
         obtaining, by the computing device, a timestamp received with the supplemental data, the timestamp corresponding to a particular time during the live event to which the supplemental data relates;
         determining, by the computing device, a current time within the audio content being played;
         storing the supplemental data received in the push notification based at least in part on determining that the timestamp received in the push notification with the supplemental data occurs after the current time within the audio content being played; and
         updating an interface to present the supplemental data together with the audio content being played, the supplemental data being presented at the interface based at least in part on identifying that the current time within the audio content being played occurs at or after the timestamp received with the supplemental data received from the push notification.

2. The computer-implemented method of claim 1, further comprising providing, by the computing device, a user interface that displays a timeline related to the audio content, wherein presenting the supplemental data received from the push notification together with the audio content being played comprises modifying the timeline displayed at the user interface to include the supplemental data such that inclusion of the supplemental data within the timeline is synchronized with respect to the audio content being played.

3. The computer-implemented method of claim 1, further comprising providing, by the computing device, a network page comprising information related to one or more live events, the one or more live events comprising the live event, wherein presenting the supplemental data received from the push notification together with the audio content being played comprises modifying the network page to include the supplemental data such that inclusion of the supplemental data on the network page is synchronized with respect to the audio content being played.

4. The computer-implemented method of claim 1, wherein the supplemental data comprises at least one of text, graphical icon data, video data, or audio data corresponding to a sub-event that has occurred within the live event.

5. A client device, comprising:
a processor;
an audio output device; and
a memory storing computer-readable instructions that, upon execution by the processor, cause the processor to:
play, utilizing the audio output device, audio content of a live event while the live event is occurring;
receive a push notification comprising supplemental data related to the live event and a timestamp associated with the supplemental data and corresponding to a particular time during the live event to which the supplemental data relates;
determine a current play time of the audio content being played;
store the supplemental data received in the push notification based at least in part on a comparison of the timestamp and the current play time; and
update an interface present the supplemental data received from the push notification based at least in part on determining that the timestamp occurs at or before a subsequent play time of the audio content being played.

6. The client device of claim 5, wherein the computer-readable instructions that cause the processor to determine the current play time of the audio content being played, comprise further instructions that cause the processor to:
while the live event is occurring and being played at the audio output device:
receive event data comprising a start time associated with the live event;
determine a duration of time for which the audio content has been played; and
calculate the current play time based at least in part on the start time associated with the live event and the duration of time for which the audio content has been played.

7. The client device of claim 5, wherein the computer-readable instructions further cause the processor to:
receive, in an additional push notification, additional supplemental data and an additional timestamp associated with the additional supplemental data and corresponding to a subsequent time during the live event to which the additional supplemental data relates;
determine an updated play time of the audio content being played; and
update the interface to present the additional supplemental data based on a determination that the subsequent time corresponding to the additional timestamp occurs after the updated play time of the audio content being played.

8. The client device of claim 5, wherein the computer-readable instructions further cause the processor to:
periodically calculate a new current play time of the audio content being played; and
compare the new current play time to the timestamp associated with the stored supplemental data, wherein the stored supplemental data is presented at the interface based at least in part on the new current play time corresponding to a time that is equal to or later than the particular time during the live event to which the stored supplemental data relates.

9. The client device of claim 5, wherein the audio content is provided by a first content provider and the supplemental data is provided by a second content provider that is different from the first content provider.

10. The client device of claim 5, wherein the push notification is formatted according to a push notification protocol.

11. The client device of claim 5, wherein the computer-readable instructions further cause the processor to determine that the audio content is being played, and wherein the computer-readable instructions that determine a current play time and store the supplemental data are executed based at least in part on determining that the audio content is being played.

12. The client device of claim 5, wherein the computer-readable instructions further cause the processor to identify a first event identifier of the supplemental data and a second event identifier of the audio content, wherein the computer-readable instructions that determine a current play time and store the supplemental data are executed based at least in part on determining that the first event identifier matches the second event identifier.

13. A computer-readable storage medium comprising computer-readable instructions that, upon execution by a computer system, configure the computer system to perform operations comprising:
playing an audio stream related to a live event while the live event is occurring;
while the audio stream is being played:
receiving a push notification comprising supplemental data related to the live event and a timestamp associated with the supplemental data and corresponding to a particular time during the live event to which the supplemental data relates;
calculating a current play time of the audio stream being played;
comparing the current play time to the timestamp;
storing the supplemental data received in the push notification when comparing the current play time to the timestamp indicates that the supplemental data received in the push notification relates to a particular time within the live event that occurs after the current play time; and
updating an interface to present the supplemental data received from the push notification based at least in part on determining that the timestamp occurs at or before a subsequent play time of the audio stream being played.

14. The computer-readable storage medium of claim 13, wherein the supplemental data originates from a third-party content provider distinct from a different third-party content provider of the audio stream.

15. The computer-readable storage medium of claim 13, wherein the instructions further configure the computer system to perform operations comprising:

determining an offset value based at least in part on a difference between the timestamp and the current play time; and scheduling the supplemental data received in the push notification to be presented at a scheduled time based at least in part on the offset value.

16. The computer-readable storage medium of claim 13, wherein the instructions further configure the computer system to perform operations comprising:

calculating a new current play time corresponding to the audio stream being played;

determining that at least one instance of supplemental data is stored having a timestamp that occurs at or before the new current play time;

in response to determining that the at least one instance of the supplemental data is stored having the timestamp that occurs at or before the new current play time, presenting the at least one instance of the supplemental data; and removing that at least one instance of the supplemental data from storage.

17. The computer-readable storage medium of claim 16, wherein calculating the new current play time and determining whether at least one instance of supplemental data is stored is performed at a periodic rate.

18. The computer-readable storage medium of claim 13, wherein the audio stream lags behind the live event by an amount of time.

19. The computer-readable storage medium of claim 18, wherein updating the interface to present the supplemental data causes a sub-event of the live event to which the supplemental data relates to be synchronized with audio being played that also relates to the sub-event.

20. The client device of claim 10, wherein the push notification protocol is a Message Queuing Telemetry Transport protocol.

\* \* \* \* \*

UNITED STATES PATENT AND TRADEMARK OFFICE
CERTIFICATE OF CORRECTION

PATENT NO.         : 10,727,963 B1
APPLICATION NO.    : 15/875786
DATED              : July 28, 2020
INVENTOR(S)        : Priyank Mishra et al.

Page 1 of 1

It is certified that error appears in the above-identified patent and that said Letters Patent is hereby corrected as shown below:

In the Claims

Column 25, Line 36, Claim 5:
Delete: "update an interface present the supplemental data"
Insert: --update an interface to present the supplemental data--

Signed and Sealed this
Third Day of November, 2020

Andrei Iancu
*Director of the United States Patent and Trademark Office*